United States Patent [19]

Atkins et al.

[11] Patent Number: 5,398,309
[45] Date of Patent: Mar. 14, 1995

[54] METHOD AND APPARATUS FOR GENERATING COMPOSITE IMAGES USING MULTIPLE LOCAL MASKS

[75] Inventors: Mark D. Atkins, Santa Clara, Calif.; Robert Adams, Lake Oswego, Oreg.

[73] Assignee: Intel Corporation, Santa Clara, Calif.

[21] Appl. No.: 63,936

[22] Filed: May 17, 1993

[51] Int. Cl.⁶ .............................................. G06F 15/62
[52] U.S. Cl. ................................. 395/135; 395/133; 395/139
[58] Field of Search ............... 395/133, 135, 136, 145, 395/147, 153, 139, 164; 340/732, 734, 747; 358/447, 448, 450; 345/112, 113, 114

[56] References Cited

U.S. PATENT DOCUMENTS

| | | | |
|---|---|---|---|
| 4,698,778 | 8/1984 | Ito et al. | 395/139 |
| 4,947,260 | 8/1990 | Reed et al. | 358/447 |
| 4,992,781 | 2/1991 | Iwasaki et al. | 740/747 |
| 5,056,041 | 10/1991 | Guttag et al. | 395/164 |

Primary Examiner—Almis Jankus
Attorney, Agent, or Firm—Steve Mendelsohn; William H. Murray

[57] ABSTRACT

A method and apparatus for generating a composite image from multiple source images using multiple local masks. Each source image is generated by an image generator. Each image generator has a local mask that indicates which pixels of the source image are to be transmitted to a frame buffer. The local mask may also be used to indicate which pixels of the source image are to be updated by the image generator.

28 Claims, 1 Drawing Sheet

METHOD AND APPARATUS FOR GENERATING COMPOSITE IMAGES USING MULTIPLE LOCAL MASKS

BACKGROUND OF THE INVENTION

1. Field of the Invention

The present invention relates to computer display systems, and, in particular, to methods and apparatuses for generating a composite image from multiple source images.

2. Description of the Related Art

Computer display systems often contain two or more drawing agents. Those skilled in the art will understand that a drawing agent may be any of a number of devices that store pixel data in a display buffer (e.g., a frame buffer). For example, the central processing unit of a personal computer may copy bitmap images from a disk into a display buffer for display in a window while a graphics controller simultaneously draws text and a video coder/decoder (codec) draws real-time video conference frames into another window. Each of these devices would thus be understood to be a drawing agent. Additionally, a single drawing agent like a central processing unit that is shared among multiple processes in a multi-tasking system may behave as multiple virtual drawing agents.

In either of these cases, windows from the different drawing agents or virtual drawing agents may be completely or partially overlapped. In regions where windows from different drawing agents overlap, images in one window may be partially obscured by another window on top of it. When this happens redundant overwriting of pixels in the regions of the overlaps may occur.

Some implementations of conventional display techniques provide visibility of the window on top by drawing the top window after drawing all of the other windows. Thus, the same pixel position on the display is sometimes written several times by various drawing agents even though the most recently written window is the only one visible.

To avoid this redundant drawing, some display systems provide a window-ID mask or window-ID data structure. This window-ID mask is a single-mask structure which identifies which process or processor is actually displayed at each pixel of the display screen. The various drawing agents check this mask to determine which pixels to update thereby eliminating the unnecessary work required to update pixels which are not displayed. The single-mask structure is processed by specialized frame buffer control hardware or by each drawing agent.

Alternatively, software is used to maintain a list of clip rectangles rather than using a mask. These clip rectangles define the boundaries of every window in a display. Clip rectangle lists require less storage area. However, they do not provide adequate information for very complex arrangements with many windows or non-rectangular window shapes.

In general, conventional schemes require brute force transmission of overlapping bitmaps on the system buses with a frame buffer controller or a central processing unit comparing these pixels against the clip rectangles or the window-ID mask. With motion video or graphics animations, these conventional schemes require a great deal of bus traffic. This bus traffic is sometimes on the order of ten megabytes to over one hundred megabytes per second.

Thus, it is well known in the art of computer graphics systems to use digital masks to control the display of window contents. In these systems, a mask usually consists of a bitmapped control bit wherein one bit is provided per display pixel. A value of one in the bitmap indicates that the corresponding pixel in the window is visible to the user and should therefore be displayed. A zero value in the bitmap indicates that the pixel is obscured or clipped by another window and should not be displayed.

SUMMARY OF THE INVENTION

The present invention is a method for generating composite images. According to this method, data of a first source image is generated with a first image generator and data of a second source image is generated with a second image generator. Data of the first source image is transmitted to a frame buffer in accordance with a first mask and data of the second source image is transmitted to the frame buffer in accordance with a second mask.

The present invention is also an apparatus for generating composite images. The apparatus includes a first image generator for (1) generating data of a first source image, and (2) transmitting data of the first source image to a frame buffer in accordance with a first mask. The apparatus also includes a second image generator for (1) generating data of a second source image, and (2) transmitting data of the second source image to a frame buffer in accordance with a second mask.

It is an object of the present invention to provide an improved method and apparatus for generating a composite image from two or more source images.

It is a further object of the present invention to reduce the bus traffic associated with the generation of composite images.

It is another object of the present invention to reduce the processing load of each source of images in a system for generating composite images.

BRIEF DESCRIPTION OF THE DRAWINGS

Other objects, features, and advantages of the present invention will become more fully apparent from the following detailed description of the preferred embodiment, the appended claims, and the accompanying drawing, in which

DESCRIPTION OF THE PREFERRED EMBODIMENTS

Figure 1:
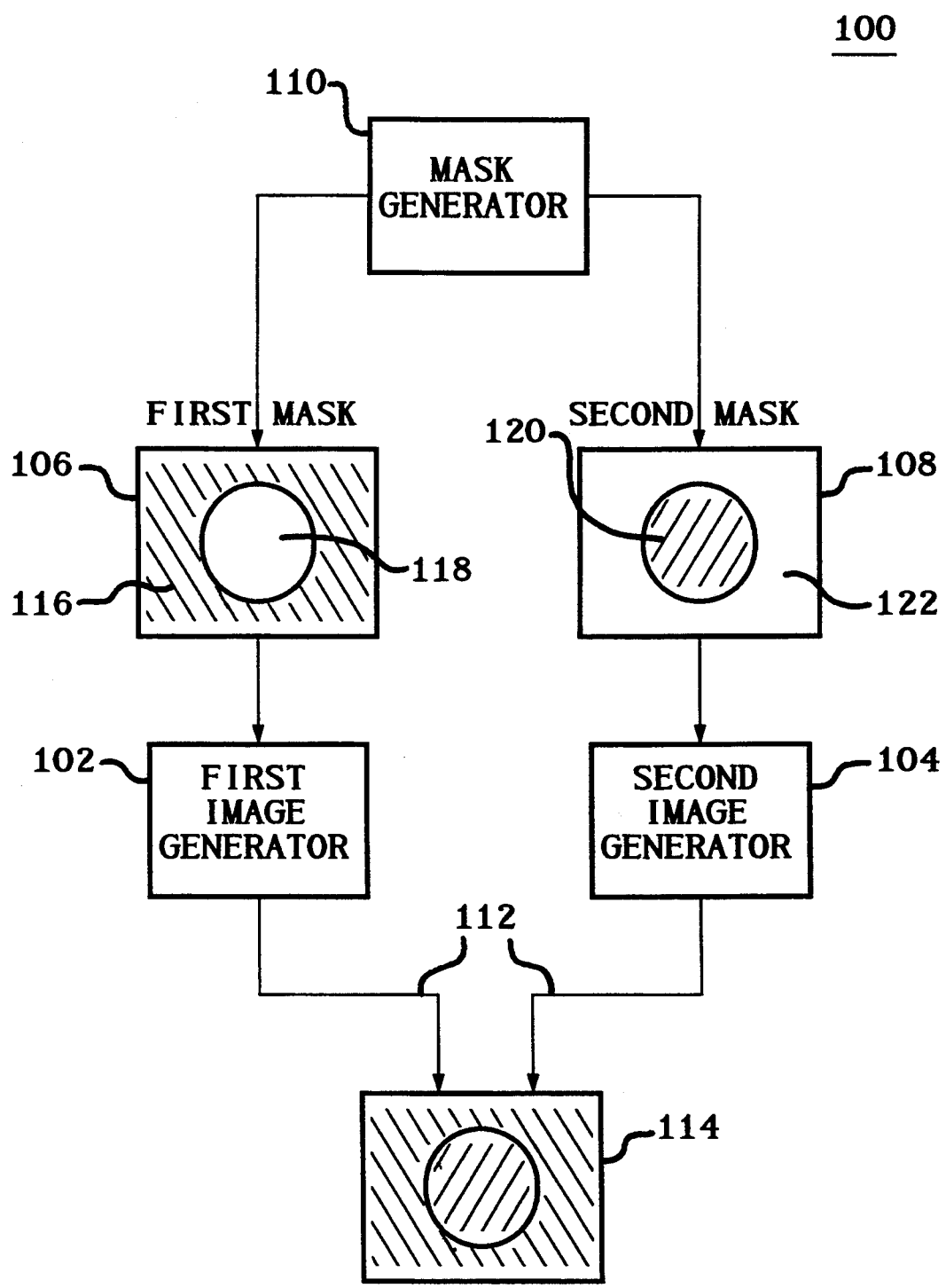
FIG. 1 shows a block diagram of a system according to the present invention for generating a composite image from two source images using local masks.

Referring now to FIG. 1, there is shown a block diagram of a system 100 according to a preferred embodiment of the present invention. System 100 combines two source images to generate a composite image that contains portions of both source images. System 100 includes first and second image generators 102 and 104, first and second masks 106 and 108, a mask generator 110, a data bus 112, and a frame buffer 114.

First image generator 102 of system 100 generates a first source image and second image generator 104 generates a second source image. First image generator 102 transmits pixel data of the first source image to frame buffer 114 according to first mask 106. Similarly, second image generator 104 transmits pixel data of the second source image to frame buffer 114 according to second mask 108. The composite image received by frame buffer 114 is the result of combining the first and second source images.

In a preferred embodiment, system 100 performs binary blending. In binary blending, each pixel of the composite image received by frame buffer 114 is identical to a corresponding pixel from one of the two source images. First mask 106 identifies which pixels from the first source image are to be included in the composite image and second mask 108 identifies which pixels from the second source image are to be included in the composite image.

First and second masks 106 and 108 are preferably binary pixel arrays (i.e., images) with the same dimensions as the first and second source images. If the value of a mask pixel is 1, then the corresponding pixel of the corresponding source image is to be included in the composite image; otherwise, the mask pixel value is 0 and the corresponding source image pixel is not to be included in the composite image. In system 100, corresponding pixels of first and second masks 106 and 108 have different values. That is, for every pixel of first mask 106 that has a value of 1, the corresponding pixel of second mask 108 has a value of 0, and vice versa.

First image generator 102 has direct access to first mask 106 and second image generator 104 has direct access to second mask 108. As such, first and second masks 106 and 108 may be said to be local masks. Based on the mask pixel values of first mask 106, first image generator 102 transmits to frame buffer 114 via data bus 112 only those pixels of the first source image that are to be included in the composite image. Similarly, based on the mask pixel values of second mask 108, second image generator 104 transmits to frame buffer 114 via data bus 112 only those pixels of the second source image that are to be included in the composite image. Thus, the number of pixels being transmitted via data bus 112 to frame buffer 114 for each composite image is the same as if only a single image generator were generating and transmitting a single image.

As depicted in the example of FIG. 1, first image generator 102 transmits to frame buffer 114 only those pixels of the first source image that correspond to region 116 of first mask 106. Those pixels of the first source image corresponding to region 118 of first mask 106 are not transmitted to frame buffer 114 by first image generator 102. Similarly, second image generator 104 transmits to frame buffer 114 only those pixels of the second source image that correspond to region 120 of second mask 108. Those pixels of the second source image corresponding to region 122 of second mask 108 are not transmitted to frame buffer 114 by second image generator 104. The resulting composite image received by frame buffer 114 contains those portions of the first source image corresponding to region 116 of first mask 106 and those portions of the second source image corresponding to region 120 of second mask 108.

System 100 may be used to generate real-time video images in which either or both of the first and second source images are updated over time by first and second image generators 102 and 104, respectively. In a preferred embodiment, first image generator 102 updates the first source image in accordance with first mask 106. That is, first image generator 102 updates only those pixels corresponding to first-mask pixels having a value of 1. The processing load of first image generator 102 is therefore reduced by updating only those pixels of the first source image that are to be included in the composite image. In a similar fashion, second image generator 104 updates the second source image in accordance with second mask 108.

In a preferred embodiment, either or both of first and second masks 106 and 108 may also be updated over time. That is, the portions of the first and second source images to be included in the composite image may vary over time. In system 100, mask generator 110 controls the generation and updating of first and second masks 106 and 108.

Since first and second image generators 102 and 104 transmit image data directly to frame buffer 114 via data bus 112, generators 102 and 104 may operate independently. As such, generators 102 and 104 may be parallel-operating co-processors or a multi-tasking single processor.

First and second image generators 102 and 104 may be 2-dimensional (2-D) or 3-dimensional (3-D) graphics software running on a CPU, such as an Intel 486 or Pentium processor with a Microsoft Windows operating system and device drivers. Alternatively, generators 102 and 104 may be graphics co-processors, such as Intel i860 processors or Texas Instruments TMS 34020 graphics co-processors, or video processors such as Intel i750 video processors.

Mask generator 110 may be a software algorithm running on a CPU or graphics processor, or distributed among several processors by means of a cache-consistency algorithm. A cache-consistency algorithm is implemented to ensure that all masks are updated to maintain consistency between masks when any mask changes are made. Mask generator 110 may also be implemented in hardware. Both alternatives are common in the state of the art for multi-processors. First and second masks 106 and 108 may be stored in memory buffers local to generators 102 and 104. Data bus 112 may be a single-memory bus, I/O bus, or multiple buses or paths. Frame buffer 114 may be a single-memory buffer or multiple buffers, as in a chromakeyed system such as the Intel Action Media-II board.

Those skilled in the art will understand that system 100 may be designed to combine different types of images. For example, real-time video, still, or graphics images may be combined with other real-time video, still, or graphics images in any combination. Still images may be generated by scanners and may have formats such as Joint Photographic Experts Group (JPEG) format or Microsoft Windows format for bitmaps (BMP).

Those skilled in the art will also understand that systems according to the present invention may be designed to combine any number of source images. For example, a system of the present invention that combines three source images may have three image generators that generate and transmit the three source images in accordance with three local masks. It will be understood by those skilled in the art that the bus traffic to the frame buffer remains the same no matter how many images are being combined by a system according the present invention.

It will also be understood by those skilled in the art that the present invention may be used to implement alpha blending in which one or more corresponding pixels from each source image are combined in some fashion (e.g., weighted average) to generate a corresponding pixel of the composite image.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating composite images, comprising the steps of:
   (a) generating data of a first source image with a first image generator;
   (b) generating data of a second source image with a second image generator;
   (c) transmitting data of said first source image to a frame buffer in accordance with a first mask; and
   (d) transmitting data of said second source image to said frame buffer in accordance with a second mask, wherein:
   said first source image comprises a plurality of first-image pixels;
   said second source image comprises a plurality of second-image pixels;
   said first mask comprises a plurality of first-mask pixels, each of said first-mask pixels having a corresponding value and each of said first-mask pixels corresponding to one of said first-image pixels;
   said second mask comprises a plurality of second-mask pixels, each of said second-mask pixels having a corresponding value and each of said second-mask pixels corresponding to one of said second-image pixels;
   step (c) comprises the step of transmitting each of said first-image pixels having a corresponding first-mask pixel of non-zero value; and step (d) comprises the step of transmitting each of said second-image pixels having a corresponding second-mask pixel of non-zero value.

2. The method of claim 1, wherein:
   step (a) comprises the step of updating each of said first-image pixels having a corresponding first-mask pixel of non-zero value;
   step (b) comprises the step of updating each of said second-image pixels having a corresponding second-mask pixel of non-zero value;
   step (a) is implemented in parallel with step (b); and
   step (c) is implemented in parallel with step (d);
   and further comprising the steps of:
   (e) updating said first mask;
   (f) updating said second mask; and
   (g) repeating steps (a) through (d) in accordance with said updated first and second masks.

3. The method of claim 1, wherein: step (a) comprises the step of generating data of said first source image with said first image generator in accordance with said first mask, and step (b) comprises the step of generating data of said second source image with said second image generator in accordance with said second mask.

4. The method of claim 3, wherein:
   step (a) comprises the step of updating each of said first-image pixels having a corresponding first-mask pixel of non-zero value; and
   step (b) comprises the step of updating each of said second-image pixels having a corresponding second-mask pixel of non-zero value.

5. The method of claim 1, wherein step (a) is implemented in parallel with step (b).

6. The method of claim 1, wherein step (c) is implemented in parallel with step (d).

7. The method of claim 1, further comprising the steps of: (e) updating said first mask; (f) updating said second mask; and (g) repeating steps (a) through (d) in accordance with said updated first and second masks.

8. The method of claim 7, wherein step (e) comprises the step of updating said first mask in accordance with a cache-consistency algorithm, and step (f) comprises the step of updating said second mask in accordance with said cache-consistency algorithm.

9. An apparatus for generating composite images, comprising:
   (a) a first image generator for:
      (1) generating data of a first source image, and
      (2) transmitting data of said first source image to a frame buffer in accordance with a first mask; and
   (b) a second image generator for:
      (1) generating data of a second source image, and
      (2) transmitting data of said second source image to said frame buffer in accordance with a second mask, wherein:
   said first source image comprises a plurality of first-image pixels;
   said second source image comprises a plurality of second-image pixels;
   said first mask comprises a plurality of first-mask pixels, each of said first-mask pixels having a corresponding value and each of said first-mask pixels corresponding to one of said first-image pixels;
   said second mask comprises a plurality of second-mask pixels, each of said second-mask pixels having a corresponding value and each of said second-mask pixels corresponding to one of said second-image pixels;
   said first image generator transmits each of said first-image pixels having a corresponding first-mask pixel of non-zero value; and
   said second image generator transmits each of said second-image pixels having a corresponding second-mask pixel of non-zero value.

10. The apparatus of claim 9, wherein:
    said first image generator updates each of said first-image pixels having a corresponding first-mask pixel of non-zero value;
    said second image generator updates each of said second-image pixels having a corresponding second-mask pixel of non-zero value; and
    said first image generator functions in parallel with said second image generator;
    and further comprising a mask generator for generating and updating said first and second masks.

11. The apparatus of claim 9, wherein:
    said first image generator generates data of said first source image in accordance with said first mask, and
    said second image generator generates data of said second source image in accordance with said second mask.

12. The apparatus of claim 11, wherein:
    said first image generator updates each of said first-image pixels having a corresponding first-mask pixel of non-zero value; and
    said second image generator updates each of said second-image pixels having a corresponding second-mask pixel of non-zero value.

13. The apparatus of claim 9, wherein said first image generator functions in parallel with said second image generator.

14. The apparatus of claim 9, further comprising a mask generator for generating and updating said first and second masks.

15. The apparatus of claim 14, wherein said mask generator updates said first and second masks in accordance with a cache-consistency algorithm.

16. A method for generating composite images, comprising the steps of:
   (a) generating data of a first source image with a first image generator in accordance with a first mask;
   (b) generating data of a second source image with a second image generator in accordance with a second mask;
   (c) transmitting data of said first source image to a frame buffer in accordance with the first mask; and
   (d) transmitting data of said second source image to said frame buffer in accordance with a second mask, wherein:
   said first source image comprises a plurality of first-image pixels;
   said second source image comprises a plurality of second-image pixels;
   said first mask comprises a plurality of first-mask pixels, each of said first-mask pixels having a corresponding value and each of said first-mask pixels corresponding to one of said first-image pixels;
   said second mask comprises a plurality of second-mask pixels, each of said second-mask pixels having a corresponding value and each of said second-mask pixels corresponding to one of said second-image pixels;
   step (a) comprises the step of updating each of said first-image pixels having a corresponding first-mask pixel of non-zero value; and
   step (b) comprises the step of updating each of said second-image pixels having a corresponding second-mask pixel of non-zero value.

17. The method of claim 16, wherein:
   step (c) comprises the step of transmitting each of said first-image pixels having a corresponding first-mask pixel of non-zero value; and
   step (d) comprises the step of transmitting each of said second-image pixels having a corresponding second-mask pixel of non-zero value.

18. The method of claim 17, wherein:
   step (a) comprises the step of updating each of said first-image pixels having a corresponding first-mask pixel of non-zero value;
   step (b) comprises the step of updating each of said second-image pixels having a corresponding second-mask pixel of non-zero value;
   step (a) is implemented in parallel with step (b); and
   step (c) is implemented in parallel with step (d);
   and further comprising the steps of:
   (e) updating said first mask;
   (f) updating said second mask; and
   (g) repeating steps (a) through (d) in accordance with said updated first and second masks.

19. The method of claim 16, wherein step (a) is implemented in parallel with step (b).

20. The method of claim 16, wherein step (c) is implemented in parallel with step (d).

21. The method of claim 16, further comprising the steps of:
   (e) updating said first mask;
   (f) updating said second mask; and
   (g) repeating steps (a) through (d) in accordance with said updated first and second masks.

22. The method of claim 21, wherein step (e) comprises the step of updating said first mask in accordance with a cache-consistency algorithm, and step (f) comprises the step of updating said second mask in accordance with said cache-consistency algorithm.

23. An apparatus for generating composite images, comprising:
   (a) a first image generator for:
      (1) generating data of a first source image in accordance with a first mask, and
      (2) transmitting data of said first source image to a frame buffer in accordance with the first mask; and
   (b) a second image generator for:
      (1) generating data of a second source image in accordance with a second mask, and
      (2) transmitting data of said second source image to said frame buffer in accordance with the second mask, wherein: said first source image comprises a plurality of first-image pixels;
   said second source image comprises a plurality of second-image pixels;
   said first mask comprises a plurality of first-mask pixels, each of said first-mask pixels having a corresponding value and each of said first-mask pixels corresponding to one of said first-image pixels;
   said second mask comprises a plurality of second-mask pixels, each of said second-mask pixels having a corresponding value and each of said second-mask pixels corresponding to one of said second-image pixels;
   said first image generator updates each of said first-image pixels having a corresponding first-mask pixel of non-zero value; and
   said second image generator updates each of said second-image pixels having a corresponding second-mask pixel of non-zero value.

24. The apparatus of claim 23, wherein:
   said first image generator transmits each of said first-image pixels having a corresponding first-mask pixel of non-zero value; and
   said second image generator transmits each of said second-image pixels having a corresponding second-mask pixel of non-zero value.

25. The apparatus of claim 24, wherein:
   said first image generator updates each of said first-image pixels having a corresponding first-mask pixel of non-zero value;
   said second image generator updates each of said second-image pixels having a corresponding second-mask pixel of non-zero value; and
   said first image generator functions in parallel with said second image generator;
   and further comprising a mask generator for generating and updating said first and second masks.

26. The apparatus of claim 23, wherein said first image generator functions in parallel with said second image generator.

27. The apparatus of claim 23, further comprising a mask generator for generating and updating said first and second masks.

28. The apparatus of claim 27, wherein said mask generator updates said first and second masks in accordance with a cache-consistency algorithm.

* * * * *